United States Patent
Edwards et al.

(10) Patent No.: US 8,020,326 B2
(45) Date of Patent: *Sep. 20, 2011

(54) MAGNETO-OPTICAL DISPLAY ELEMENTS

(75) Inventors: Charles O. Edwards, Rio Rancho, NM (US); James Caruso, Albuquerque, NM (US)

(73) Assignee: TRED Displays Corporation, Rio Rancho, NM (US)

( * ) Notice: Subject to any disclaimer, the term of this patent is extended or adjusted under 35 U.S.C. 154(b) by 373 days.

This patent is subject to a terminal disclaimer.

(21) Appl. No.: 11/862,886

(22) Filed: Sep. 27, 2007

(65) Prior Publication Data

US 2008/0072467 A1    Mar. 27, 2008

Related U.S. Application Data

(60) Provisional application No. 60/847,601, filed on Sep. 27, 2006, provisional application No. 60/847,603, filed on Sep. 27, 2006, provisional application No. 60/875,514, filed on Dec. 18, 2006.

(51) Int. Cl.
*G09F 9/00*    (2006.01)
(52) U.S. Cl. ............................................. 40/449; 345/86
(58) Field of Classification Search .................... 40/449; 345/86
See application file for complete search history.

(56) References Cited

U.S. PATENT DOCUMENTS

| | | | |
|---|---|---|---|
| 1,191,023 A | 7/1916 | Naylor | |
| 2,667,542 A | 1/1954 | Wright | |
| 2,708,722 A | 5/1955 | Wang | |
| 2,736,880 A | 2/1956 | Forrester | |
| 3,140,553 A | 7/1964 | Taylor | |
| 3,161,861 A | 12/1964 | Olsen et al. | |
| 3,581,301 A * | 5/1971 | Stutz et al. | 345/111 |
| 3,936,818 A | 2/1976 | Skrobisch | |
| 4,126,854 A | 11/1978 | Sheridon | |
| 4,161,037 A | 7/1979 | Seleznev et al. | |
| 4,464,752 A | 8/1984 | Schroeder et al. | |
| 4,577,427 A | 3/1986 | Browne | |
| 4,769,638 A * | 9/1988 | Woolfolk | 345/111 |
| 4,811,008 A * | 3/1989 | Woolfolk | 345/111 |
| 4,932,147 A * | 6/1990 | David | 40/448 |
| 5,005,305 A | 4/1991 | Turney et al. | |
| 5,515,075 A * | 5/1996 | Nakagiri et al. | 345/111 |
| 5,596,447 A | 1/1997 | Onodera | |
| 5,809,675 A | 9/1998 | Tijanic et al. | |
| 5,904,790 A * | 5/1999 | Sheridon | 156/83 |
| 6,147,791 A * | 11/2000 | Sheridon | 359/296 |
| 6,510,632 B1 | 1/2003 | Weinacht et al. | |
| 6,542,283 B1 | 4/2003 | Sheridon | |
| 6,603,458 B1 | 8/2003 | Fischer et al. | |
| 6,864,865 B2 | 3/2005 | Maeda | |

(Continued)

FOREIGN PATENT DOCUMENTS

JP    05188872    7/1993

(Continued)

*Primary Examiner* — Joanne Silbermann
*Assistant Examiner* — Kristina Staley
(74) *Attorney, Agent, or Firm* — Deborah A. Peacock; Philip D. Askenazy; Peacock Myers, P.C.

(57) ABSTRACT

Composite magneto-optical elements with unique shapes and architectures comprising a magnetic component and a colored component. These magneto-optical elements can also be manufactured by a small variety of low-cost processes resulting in their use in a variety of applications including low-cost, large-format, reflective display devices.

19 Claims, 7 Drawing Sheets

U.S. PATENT DOCUMENTS

| | | | |
|---|---|---|---|
| 6,897,848 B2 * | 5/2005 | Sheridon | 345/107 |
| 6,970,155 B2 | 11/2005 | Cabrera | |
| 7,206,119 B2 | 4/2007 | Honeyman et al. | |
| 7,304,787 B2 | 12/2007 | Whitesides et al. | |
| 7,394,509 B2 | 7/2008 | Sage | |
| 7,843,626 B2 | 11/2010 | Amundson et al. | |
| 2002/0015831 A1 * | 2/2002 | Sheridon et al. | 428/195 |
| 2002/0131151 A1 | 9/2002 | Engler et al. | |
| 2002/0185216 A1 | 12/2002 | Biegelsen et al. | |
| 2002/0196216 A1 | 12/2002 | Tokuyo et al. | |
| 2004/0164950 A1 | 8/2004 | Cabrera | |
| 2006/0038772 A1 | 2/2006 | Amundson et al. | |
| 2007/0057908 A1 | 3/2007 | Jacobson | |
| 2007/0200795 A1 | 8/2007 | Whitesdies et al. | |
| 2007/0200819 A1 | 8/2007 | Song | |
| 2008/0074365 A1 * | 3/2008 | Edwards et al. | 345/86 |
| 2008/0278472 A1 | 11/2008 | Huitema et al. | |
| 2009/0174651 A1 | 7/2009 | Jacobson et al. | |
| 2010/0265239 A1 | 10/2010 | Amundson et al. | |

FOREIGN PATENT DOCUMENTS

| | | |
|---|---|---|
| JP | 07248731 | 9/1995 |
| JP | 08197891 | 6/1996 |
| JP | 2001222031 | 8/2001 |
| JP | 2002006346 | 1/2002 |
| JP | 2002366102 | 12/2002 |
| JP | 2006-520488 A | 9/2006 |
| JP | 2006520488 | 9/2006 |
| WO | WO2008039954 | 4/2008 |
| WO | WO2008039955 | 4/2008 |

* cited by examiner

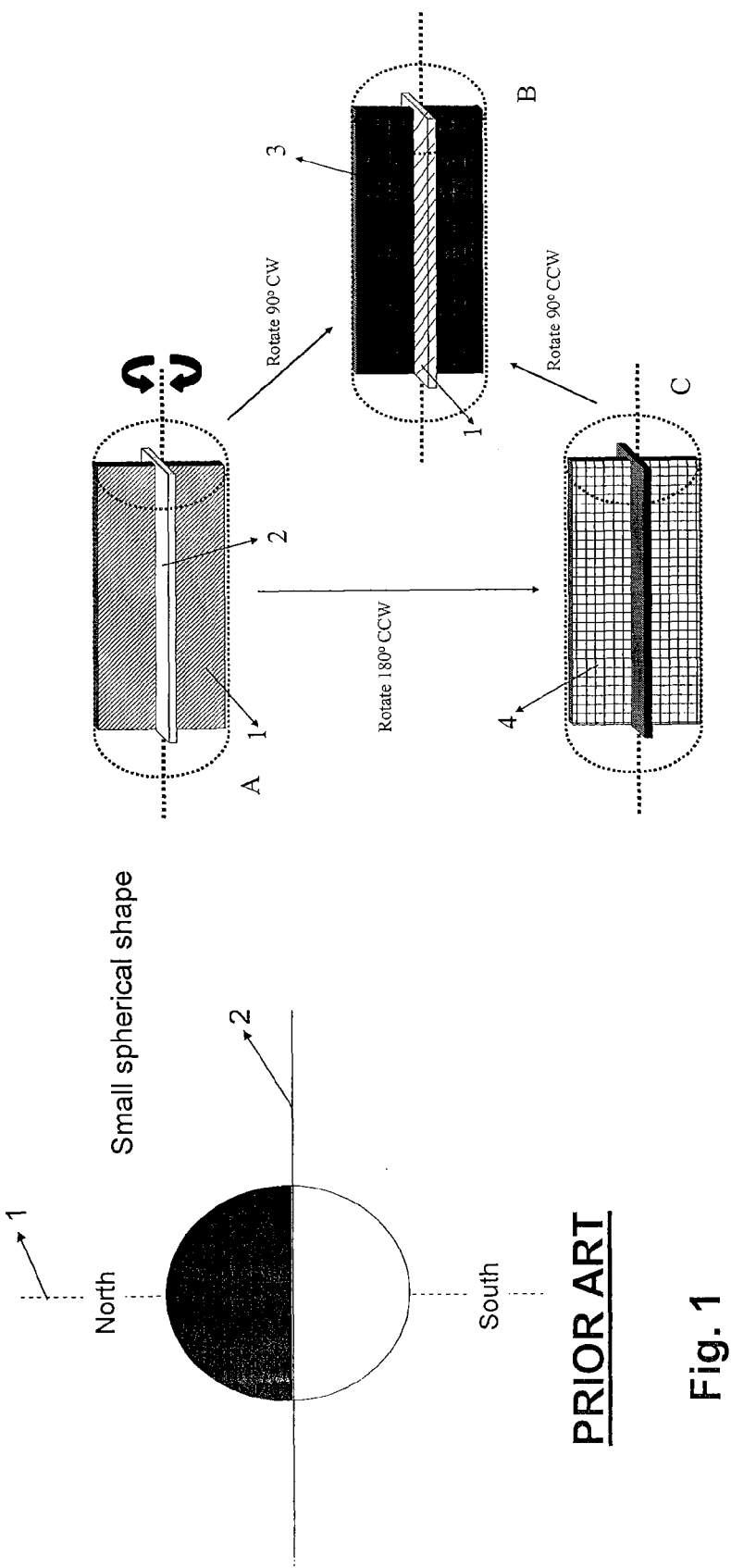

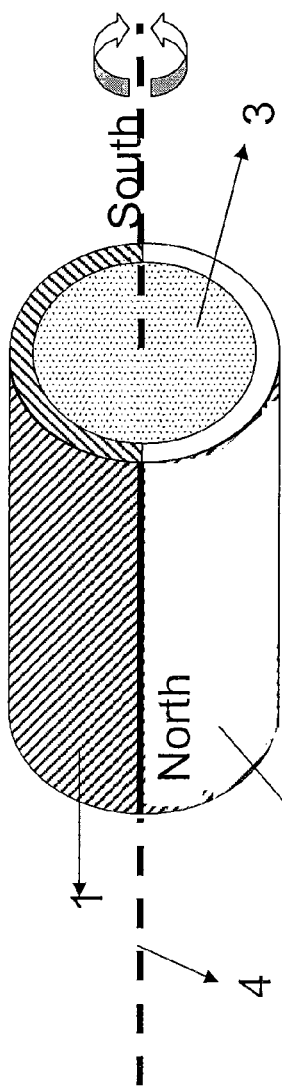
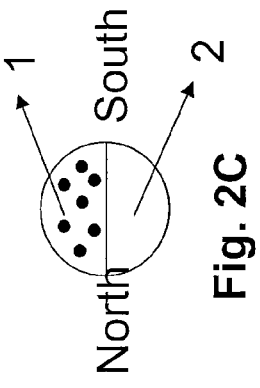
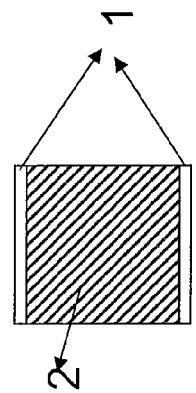
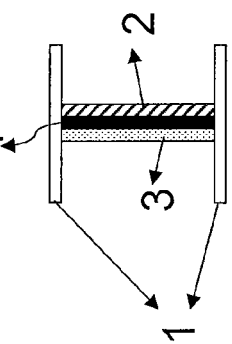
Fig. 2A
Fig. 2B
Fig. 2C
Fig. 2D
Fig. 2E

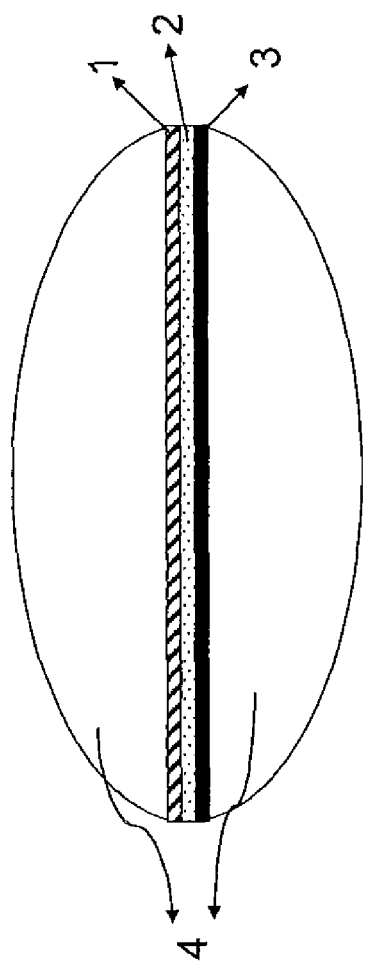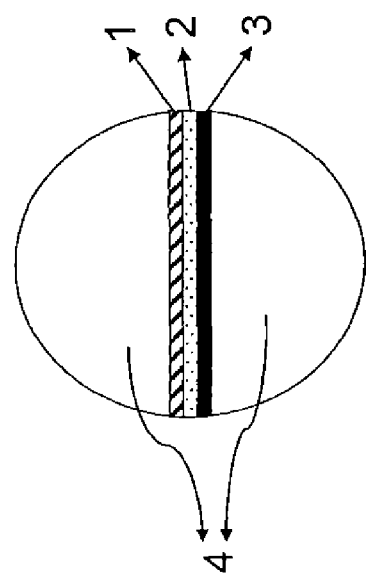
Fig. 4

MAGNETO-OPTICAL DISPLAY ELEMENTS

CROSS-REFERENCE TO RELATED APPLICATIONS

This application claims the benefit of and priority to U.S. Provisional Application No. 60/847,601, filed Sep. 27, 2006, U.S. Provisional Application No. 60/847,603, filed Sep. 27, 2006 and U.S. Provisional Application No. 60/875,514, filed Dec. 18, 2006, all of which are incorporated herein by reference in their entirety.

BACKGROUND OF THE INVENTION

1. The Field of the Invention

Embodiments of the present invention relate to design and manufacture of novel magneto-optical display elements. These magneto-optical elements have numerous uses in a variety of applications including sensor elements, games, etc but most notably information displays and large-format, reflective, low-cost bistable displays. These resulting displays are well suited for a variety of applications including indoor and outdoor message boards, scoreboards, clocks, temperature displays, variable message signs, transportation information displays and the like.

2. The Relevant Technology

While magnetics itself and the study of magnetic materials is an old discipline that dates back centuries and is still studied heavily today (see Spaldin, N., Magnetic Materials Fundamentals and Device Applications, Cambridge Univ. Press, 2003; Kittel, C. Introduction to Solid State Physics, Wiley, 1996), few attempts have been made to develop magnetic-optical materials suitable for displays. The study of magnetic materials themselves has resulted in significant technological advances, such as in 1898 and 1928 by Poulsen and Pfleumer, respectively, leveraging magnetic phenomena in the development of magnetic in recording media. Further, in the 1960's magnetic materials were used to store memory, first by Forrester et al and others (U.S. Pat. Nos. 2,736,880, 2,667,542, 2,708,722). Magnetic core memory, pioneered by Olsen and others (U.S. Pat. Nos. 3,161,861, 4,161,037, 4,464,752) has seen significant attention for decades due to its implications on the computing industry but for a number of reasons was replaced by silicon-based memory devices.

Starting in the early 1900s, there were various electronic signage technologies that used magnetics in the form of electromagnetic actuators (Naylor U.S. Pat. No. 1,191,023, Taylor U.S. Pat. No. 3,140,553 and Browne U.S. Pat. No. 4,577,427). These discrete actuators were generally variations of small electromagnetic coils or motors with a reflective mechanical flap apparatus. They were broadly used and a small number of these devices are still in use today for specific outdoor signage applications like score boards and transit signs. However, they have become obsolete with the advent of solid-state light emitting diodes (LEDs). In addition, these devices were generally expensive to construct, suffered from limited reliability and resolution due to the size of the discrete mechanical assemblies needed for each display pixel.

Development continued in the use of magnetic actuators for displays by Weiacht (U.S. Pat. No. 6,510,632) where magnets were attached to large flaps or "flags" that could be rotated 180 degrees in forming a signage character. This type of technology was continued with the patents of Fischer et al and others (U.S. Pat. Nos. 6,603,458, 3,936,818) again discussing the use of magnetically driven flaps as individual display pixels. These devices are mounted on a mechanical axis and only one magneto-optic "flag" is used in each individual device.

More recently, some work has been accomplished with respect to magnetic-optical materials suitable for display technologies. Here, workers utilized bi-colored magnetic particles instead of mechanical flaps. The use of smaller discrete magnetic spheres has been envisioned as a display design by Magnavox (Lee, L. IEEE Transactions on Electron Devices, ED-22, P758) and more recently by Katsuragawa et al. (Japan Patent Publication 2002-006346) and to a lesser extent by Masatori (Japan Patent Publication 08-197891). This art deals primarily with the use of small magnetic particles which respond to an external magnetic field by rotating. The rotation of these magnetic particles is in response to the external field and the particles desire to lower their potential energy. Here, as shown in FIG. 1, the magnetic elements are spherical in shape and are magnetized such that the magnetic dipoles, shown at 1, are perpendicular to their plane of color separation, shown at 2. Moreover, these magnetic particles are extremely small, in the micron-sized range, having magnetic and optical orientations significantly different from those disclosed in herein. These micron-sized elements would require very technically advanced and expensive processes in their fabrication such as gas-phase formation and/or coating, colloid-growth processes or the like.

The vast majority of work performed with respect to magnetics exhibiting optical effects revolves around phenomena like the Kerr Effect (J. Kerr, Phil. Mag. 3, 321, 1877) which relates to changes of light reflection off magnetic materials. This phenomenon is in large part, the basis for the field of optical isolators, and very advanced materials showing such effects such as $Cd_xMn_yHg_zTe$ (Onodera, U.S. Pat. No. 5,596,447).

Permanent magnetic materials (O'Handley, R. C. Modern Magnetic Materials Principles and Applications, Wiley, 2002), by which magneto-optical elements can be formed are generally limited to permanent materials such as Ferrites (with the formula $AB_2O_4$, spinel structure, e.g. $ZnFeO_4$), alloys such as "Alnico" (Aluminum, Nickel and Cobalt alloys, often with added Iron, Copper or Titanium), Permalloy (a Nickel Iron Alloy) or magnetically stronger rare-earth magnets, most notably Neodymium Iron Boron ("Neo," like $Nd_2Fe_{14}B$) or Samarium Cobalt (alloys similar to $SmCo_5$). These rare-earth magnetic materials have vastly superior magnetic strengths compared to other magnetic materials and higher curie temperatures that increase their effective operating temperature range. Rare-earth magnets typically have static magnetic field strengths as high and even greater then 1.2 Tesla, very high compared to their non-rare-earth counterparts which typically have field strengths as low as 50-100 milliTesla.

The invention disclosed herein uses significantly different architectures, materials selections and fabrication methods compared to any previous magnetic-optical materials, compositions, composites or materials used in display fabrication.

BRIEF SUMMARY

Embodiments disclosed herein relate to magnetic display elements and methods of manufacture. A first embodiment disclosed herein relates to a composite magnetic display element. The magnetic display element includes a body material portion, a magnetic material portion, a first optical portion having a first color and a second optical portion having a second color, wherein the first and second optical portions bisect along a plane of color separation. The magnetic display element is magnetized such that a North-South dipole of the display element is parallel to the plane of color separation and perpendicular to an axis of rotation of the display element.

A second embodiment disclosed herein relates to a composite magnetic display element. The magnetic display element includes a body material portion, a magnetic material portion, a first optical portion that is clear or transparent, a second optical portion having a first color, and a third optical portion having a second color, wherein the second and third optical portions bisect along a plane of color separation. The magnetic display element is magnetized such that a North-South dipole of the display element is parallel to the plane of color separation and perpendicular to an axis of rotation of the display element.

A third embodiment disclosed herein relates to a composite magnetic display element. The magnetic display element includes a body material portion, a magnetic material portion, a first optical portion having a first color and a second color, wherein the first and second colors form a first color plane and a second optical portion having a third color and a fourth color, wherein the third and fourth colors form a second color plane. The first and second color planes are perpendicular to one another.

A fourth embodiment of the present invention relates a method of manufacture of a composite magnetic display element. The method includes the steps of: obtaining a magnetic material portion, placing a first color portion onto a first side of the magnetic material portion, placing a second color portion onto a second side of the magnetic material portion that is opposite the first side, wherein the combination of the magnetic material portion and the first and second color portions comprises a laminate combination, and stamping the laminate combination to obtain the composite magnetic elements.

A fifth embodiment of the present invention relates a method of manufacture of a composite magnetic display element. The method includes the steps of: obtaining a magnetic material, obtaining a body portion material, wherein the body portion material is one of a plastic or polymer, ceramic, glass, metal, alloy, or any combination thereof, combining the magnetic material and the body material into a composite element, extruding the composite element to form the magnetic display elements, and magnetizing the display elements and fixing the magnetic orientation of a North-South dipole of the display element.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 illustrates the prior art with a magnetic element wherein magnetic dipole axis is perpendicular to plane of color separation with micron-sized spherical shape.

FIG. 2 illustrates various shapes and architectures of magneto-optical elements. FIG. 2A illustrates a magneto optical element (MOE) with a magnetic composite core (3A), two distinct optical layers (1 and 2) and the center axis of rotation (4) with the magnetic dipole running parallel to and bisecting of the optical layers. FIG. 2B shows a side view of an oblong (football shaped) MOE with two distinct optical layers (1 and 2). FIG. 2C shows an end-on view of an oblong MOE (as in FIG. 2B but rotated 90 degrees to the left or right) with two distinct optical layers (1 and 2). FIG. 2D shows a "dumbbell-shaped" magneto optical element (MOE) with circular top and bottom ends (1), distinct optical layers (2 and 3) and a magnetic material (4). FIG. 2E shows a "dumbbell-shaped MOE (as in FIG. 2D but rotated 90 degrees to the left) with one optical layer (2) now facing the observer and the circular top and bottom portions (1).

FIG. 3 is a schematic cut-away illustration of MOEs each having a different position of the magnetic material component.

FIG. 4 shows a schematic of MOEs wherein two optically clear portions are in incorporated with a magnetic and two color portions.

FIG. 6 illustrates a MOE structure wherein two two-color planes are placed perpendicular to one another. Figure also shows how rotation of such MOE can generate 4 colors.

DETAILED DESCRIPTION

Figure 3C:
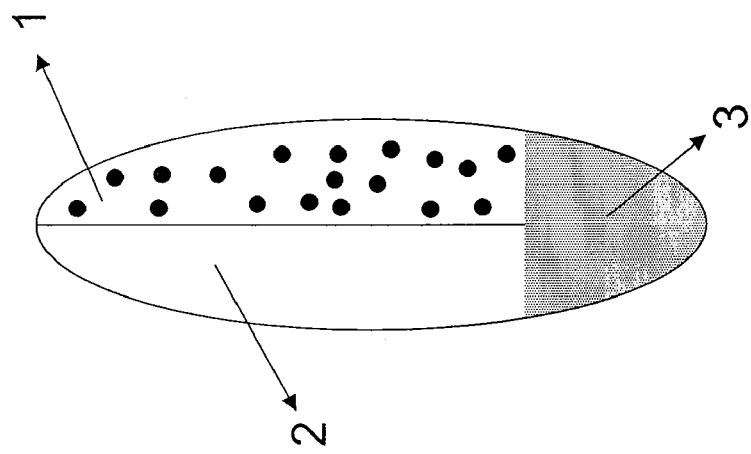
FIG. 3C shows a magneto optical element (MOE) with two discrete optical layers (1 and 2) and a magnetic center (3) at the bottom of the MOE such that the center of gravity of the MOE is weighted toward the bottom making it self-align when put in a zero bouncy fluid.

The principles of the present invention relates to a new type of device made of a new multi-composite material that has both magnetic and optical properties and methods for manufacturing this material into magneto-optical elements for use in bistable, reflective, magneto optical displays. These magneto-optical elements, herein referred to as MOEs, have numerous applications in display-related applications. These MOEs can be actuated with a low power external magnetic field producing a rotation and change in color which can be taken advantage of in unique ways to produce a low-cost, low-power, reflective, large-format, flat panel for displays that are bistable and can be manufactured using low-cost, industrial manufacturing processes.

In one embodiment of the present invention, a magneto-optical element consists of a composite mixture of a polymer "body" material, a magnetic material and at least two colored materials. This MOE device generally has a magnetic material designed to respond to an external magnetic field, resulting in rotation of the MOE to show to a viewer one of the two colors which is on or near the outermost surface of the MOE. Unlike other implementations, in this embodiment the MOE magnetic field is parallel to the plane of color separation and the viewing plane of the display rather then in a perpendicular and vertical architecture.

In another embodiment of the current invention, the magneto-optical element is non-spherical. Here, the MOE has an aspect ratio of 1 or more, can be cylindrical in shape, near cylindrical, oblong in shape or the like.

In another embodiment, the magnetic material can be distributed in a variety of ways within the MOE device. For example, the magnetic/plastic material can be symmetrically distributed below the color layers or located only in the center of the MOE in a thinner layer formation and even on one end or the other. These different orientations of the magnetic materials can be taken advantage of in different ways that are advantageous.

In a preferred embodiment of the current invention, the MOE contains an anisotropic rare-earth magnetic material, most notably materials similar to $Nd_2Fe_{14}B$ or $Sm_5Co$. These are high-field hard or permanent magnetic materials and can be "magnetized" to fix their new dipoles anytime during the MOE formation processes but most notably at the end of the MOE fabrication process.

One embodiment of the current invention is a magnetic optical element as described above where there is also a clear section or component to the MOE. Here, this clear component is normally a non-colored plastic which is see-through to the viewer which can be utilized in unique ways.

One embodiment of the current invention is a magnetic optical element which consists of two 2-colored perpendicular planes. In a variety of near cylindrical shapes this MOE structure results in a MOE which can be rotated to show 4 distinct colors to the viewer. Because this MOEs also contain a magnetic component, they can be rotated by an external magnetic field, thus generating or showing one of the four colors. This MOE may or may not contain a clear portion within its construction.

Another embodiment of the current invention relates to methods of manufacture of the above disclosed MOEs. One method of manufacture consists of extrusion or co-extrusion of magnetic/plastic blends and colorant/plastic blends. Here, it is important to note that the entire MOEs can be co-extruded in one extrusion process or the magnetic/plastic component (MOE sub-component) can be extruded first and then the optical color coatings can be applied thereafter by a variety of means, including painting and the like.

Another embodiment of the current invention relates to stamping as a means of MOE fabrication. Here, laminates of plastic and magnetic and colorant materials can be stamped out to produce a MOE of a predetermined shape. It should be noted here that various polishing and de-burring steps can be used in this process to produce MOEs with little defects suitable for low friction rotation in resulting applications.

MOEs (Magneto Optical Elements) are specially shaped parts that are composed of composite materials with magnetic and optical components. In one embodiment of the invention, a plastic or other body material is blended with anisotropic "rare earth" magnetic powders in an average concentration up to 10 percent magnetic material by unit volume. The ratio of plastic to "rare-earth" anisotropic powder is used to control the overall magnetic field strength of the final MOE parts. The finished MOEs also have pigmented optical coatings on at least two sides such that they can be rotated to appear to the viewer as either of the two colors. The blend of plastic and "rare-earth" anisotropic powders can be suitable for extrusion, casting, stamping and other thermal forming plastic processes.

A key component in a display which utilizes such MOEs is low cost, easily manufactured, permanent magnetic particles that can respond to an external magnetic field. MOEs require a permanent magnetic field that is aligned to the optical surfaces on the particle. MOEs respond to an external magnetic field by rotating in response to the external field. The mass of the MOEs is important because the less mass the MOEs have the less energy is needed to rotate them and the less friction they will create.

The magnetic material within the MOEs performs several functions. The first is that the attraction of MOEs to their neighbors will cause them to align their magnetic fields. The permanent magnetic field within the MOEs is sufficient to create a rotational force that will cause alignment between neighboring MOEs. When the magnetic field of neighboring MOEs is aligned, this also creates alignment of the optical layers.

It is important to be able to control the magnetic strength of the MOEs. If the magnetic field strength of the MOEs is too low, the MOEs will not self align and the actuation of the MOEs by an external field becomes increasingly difficult. If the MOEs have too strong of a magnetic field, they can create a strong interfering force between neighboring MOEs that must be overcome by the external magnetic field to actuate the MOEs. Overcoming MOE to MOE magnetic forces can decrease efficiency if MOEs of higher then needed magnetic strength are used. For display applications the magnetic field strength of the MOEs will generally be in the range of 40 milliTeslas or less.

Traditional magnetic materials such as "Alnico," magnetite ($Fe_3O_4$) and other permanent magnetic ferrite and ferrous materials can be heavy, temperature sensitive and costly to manufacture into magnetic display components. Recent breakthroughs in "rare earth" magnetic materials have created a new class of magnetic powders. These materials are primarily, but not limited to, Neodymium Iron Boron materials and Samarium Cobalt alloys and are commonly referred to as "rare earth" magnetic materials. They are commonly available in particle sizes of 50 to 100 microns and new classes of these powders are anisotropic.

In a preferred embodiment of this invention, a composite thermal plastic material is developed by blending rare earth magnetic powders (anisotropic is preferred) into a thermal plastic such as Nylon, Acrylic, Polycarbonate, PET or other plastic material suitable for compounding with magnetic materials. The percentage of "rare earth" magnetic powder loading in the plastic will range up to 10% loading by volume. This creates a light weight, formable magnetic plastic composite material. Because the magnetic field strength of these anisotropic "rare earth" powders can achieve 700 milliTesla and greater in strength, only a small percentage of powder is needed in the composite plastic to achieve the target field strengths of 1-40 milliTeslas which are used in the MOEs. Higher powder loading may be used in some applications. Of course one of skill in the art will appreciate that the rare earth magnetic materials or powders may also be combined with ceramics, glasses, composites, metals, alloys and the like. Accordingly, plastics or polymers, ceramics, glasses, composites, metals, alloys and the like or any combination thereof may be considered a body material and may be combined with magnetic material to create the MOEs.

Magnetization of the magneto-optical particles is performed after the MOE particles are formed using a capacitive discharge magnetizer or a Halbach array with a field strength of approximately 3 Tesla. The "rare earth" particles within the plastic composite reach full saturation at this field strength. The preferred method to control MOE magnetic field strength is by varying the concentration of the "rare-earth" magnetic material in the composite, not through partial magnetization. Partial magnetization may be used, but it is generally more difficult to control and more costly. In the same way, "isotropic" rare-earth magnetic powders may be used but are less desirable. They require the added step of having a magnetic field applied during the forming of the parts, such that the particles of magnetic material may be aligned to their preferred magnetic orientation. Anisotropic powders are more desirable because the MOEs can be formed without the need for this magnetic field during the components forming process because the magnetic particles are not sensitive to orientation.

The next step in manufacturing of MOEs is creating the optical surfaces. In most applications, there will be two color surfaces. These surfaces should be aligned with the magnetic field of the MOEs. Several methods can be used to create the color layers. A laminated "sandwich" structure can be made with the magnetic composite material in the center in a higher concentration and the color material on the two outside surfaces being purely structural and optical with no magnetic characteristics. Then this laminate can be thermal formed, cut, ground or drawn, or stamped.

Another method is to co-extrude pigmented plastic color layers on the outside as optical surfaces while extruding a core of composite magnetic material. In this way simple cylindrical extrusions can be done and then cut to the desired length. This is a very low coast and effective method of manufacturing. It has been demonstrated that the rare earth magnetic powders and plastics can be pre-pelletized in a desired loading to further increase ease of manufacturing.

Another method is to extrude only one material that is a magnetically loaded plastic composite. This is the simplest forming process. After extrusion they are painted on both sides with the desired colors, magnetized and cut to the desired lengths.

Because the rare-earth magnetic powder has a significantly dark color, it is possible in some applications to add pigment to the composite magnetic plastic and achieve dark colors this way. White and other light color pigments may look dark or "dirty" using this technique because of the darker "rare earth" magnetic powder. This technique can make it possible to create two color MOEs with only a single additional color material if the composite magnetic plastic materials also contains pigment and acts as both the dark color layer and the magnetic core.

The magnetic field of the MOEs can be aligned to the color layers by either magnetizing the MOEs first, then aligning their magnetic field prior to the color deposition step. Or it is possible to completely fabricate the MOEs first with their optical layers and then place then in the magnetizer aligned such that the poles of the magnetic field are properly aligned to the color layers.

Referring now to FIGS. 2A, 2B and 2C, several embodiments of a magneto-optical element (MOE) are illustrated. As shown in these figures, the MOEs include a magnetic and body portion, given at 3, and at least two colored or optical coatings designated at 1 and 2. The body portion may include, but is not limited to, plastics or polymers, ceramics, glasses, composites, metals, alloys and the like. The MOEs disclosed herein have a magnetic dipole axis whereby such axis is parallel to the plane of color separation and perpendicular to the MOE axis of rotation designated by 4, all as illustrated in FIG. 2A. While FIG. 2A shows a cylindrical MOE, FIG. 2B shows an oblong ("football" shaped) MOE and FIG. 2C is the end-view of the "football shape."

It is envisioned that there is value in creating MOEs with more complex shapes to reduce mass and friction while potentially improving optical performance. For example in one embodiment, the MOEs may be extruded or cast in an "I" beam shape, as shown in FIGS. 2D and 2E where there is a circular end section designated at 1 and a middle section designated with two optical layers designated at 2 and 3, with a magnetic material designated at 4. Note that the middle section is thin and thus reduced mass in one perspective (FIG. 2D) but when rotated to line up parallel to the viewing plane in a display, is wide and thus acts well as a display element (FIG. 2E). This architecture is also beneficial in that the MOEs when rotated to show their color (FIG. 2E) will align very flat to one another compared to MOE designs with curved sides. This results in decreased shadows in the display and increased reflectivity due to the very flat MOE to MOE surfaces that will result, which is advantageous. Note also that slight variations of this specific structure are also to be considered as contemplated by the principles of the embodiments disclosed herein.

With the top and bottom of the I-beam MOE being circular to enable rotation, the reduced size and mass of the middle section, lower magnetic field strength is required for MOE rotation and the optical layers are primarily flat for improved performance and the circular top and bottom still enable smooth rotation. The key components of this embodiment are that there is a specific shape that permits the MOEs to rotate freely in one axis, that a magnetic composite material is used in controlled concentration to enable control of the permanent magnetic field strength and that at least two optical surfaces are on the parts such that they can be rotated to create the appearance of at least two different optical states (usually colors). In addition to color pigments, other optical coating may be used such as reflectors or phosphors. Note that in the specification and in the claims, a "color" can consist of, but is not limited to, a colorant (typically occurs by the addition or use of traditional paints, pigments, dyes or the like), a reflective medium (like use of a mirror or the like) or a phosphorescent, fluorescent or luminescent medium (for example by the addition of phosphors).

Figure 3B:
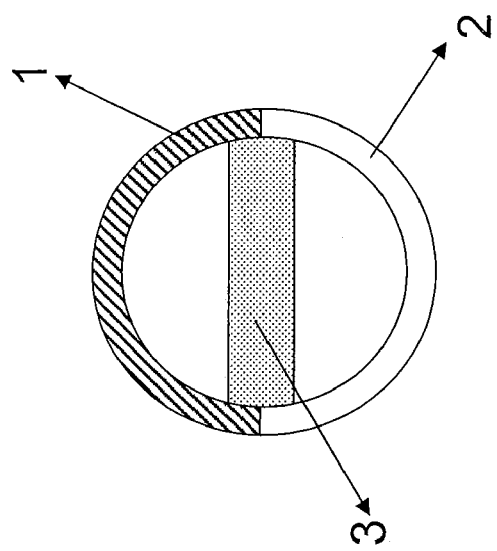
FIG. 3B shows the cross section of a magneto optical element with discrete optical layers (1 and 2) and magnetic core (3) which is formed into a center layer instead of filling the entire core (as compared to the magnetic core (3) in FIG. 3A).
Figure 3A:
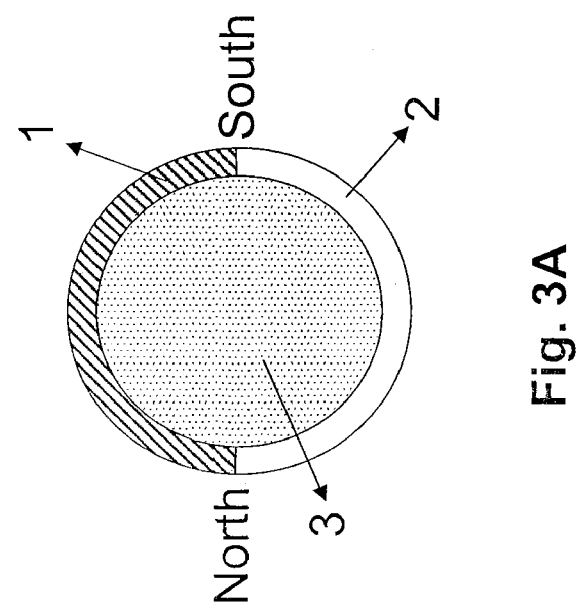
FIG. 3A shows the cross section of a magneto optical element (MOE) with discrete optical layers (1 and 2) and magnetic core (3). The magnetic dipole is parallel to and bisects the optical layers.

One embodiment of the current invention is the composition of the MOEs wherein there is a magnetic material within the MOE, typically a hard permanent magnetic material that is mixed or combined with a body portion. In reference to FIG. 3, the MOEs can have the magnetic material located in the MOEs in a variety of ways as shown in FIGS. 3A, 3B and 3C. In FIG. 3A, the magnetic material 3 is distributed evenly in a circular form within the MOE whereby two different color layers 1 and 2 cover the magnetic (magnetic/plastic or other body material composite in many cases) center 3.

FIG. 3B shows a MOE where the magnetic material 3 is localized in a rectangular shape near the center of the MOE only. Like in FIG. 3A, in FIG. 3B, color layers 1 and 2 cover the outermost portions on the MOE to give it its desired optical properties. FIG. 3C shows yet another variation where the magnetic material 3 is preferentially located at one end of an oblong shaped MOE, with the two colors 1 and 2 located in the outermost section of the MOE. In this embodiment it is desirable to put the magnetic material in a single layer in the bottom of the MOE or at least in a higher concentration in the bottom of the MOE. In the case of a MOE cylinder, the magnetic material could be loaded into the bottom in a disk of heavier material. If such MOEs are constructed of a plastic foam or other hollow or very light material with a low specific gravity, it is possible to use them in a fluid such that they will self align. In the case where the bottom of the MOE has a greater specific gravity then the carrier fluid and the top half of the MOE has a lower specific gravity then the surrounding fluid, the MOEs will align parallel to the pull of gravity. In this bottom-loading MOE configuration it is also possible to concentrate the MOEs magnetic force and the magnetic force needed by the external write field to the bottom area of the MOE which can also make it more efficient.

Reference is now made to FIGS. 4A and 4B, which illustrate an additional embodiment of the present invention. In reference to FIGS. 4A and B, it should be noted that MOEs disclosed herein can also have a structure such that they contain a magnetic portion, designated at 2, a first colored portion designated at 1, a second colored portion designated at 3 and two optically clear portions designated at 4. As shown, the clear portions (4) of these MOEs can be used in novel ways since they are essentially see-through. It should be noted that various shapes of MOEs can have structures such that there is are clear portions, where FIG. 4A shows an end-view of cylindrical MOE and FIG. 4B shows a side view of "football shaped" MOE.

Figure 5:
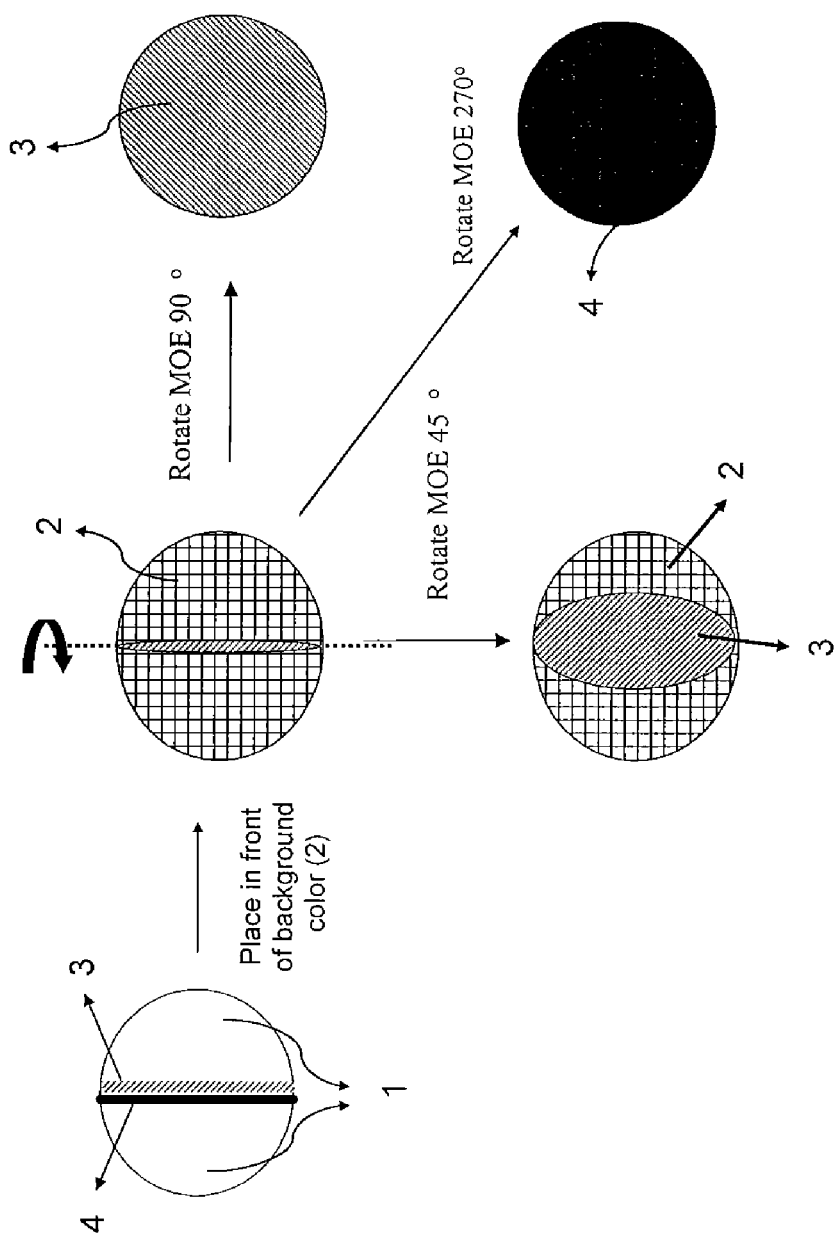
FIG. 5 illustrates MOEs with clean portions and how rotation of such a MOE can generate 3 colors if placed in front of a single color.

Reference is now made to FIGS. 5A-5E, which illustrate a further embodiment of the present invention. In referring to FIGS. 5A-5E, the MOEs with a clear region can be used such that a third color can be seen by proper orientation in a display-type application. Here, FIG. 5A shows a cross section of such a MOE with clear portions designated at 1 and a first and second color portions designated at 3 and 4 respectively. FIG. 5B shows the same MOE placed in front of a colored backplane designated at 2.

FIGS. 5C, 5D and 5E illustrate the MOE of FIGS. 5A and 5B as it rotates in various ways. The MOE itself contains the first and second colors (3 and 4), as well as a magnetic section (not illustrated) and clear portions (2). As can be seen in these figures, as the MOE rotates, three different colors can be seen. At a first angle of rotation, such as 90 degrees shown in FIG. 5C, the first MOE color (3) can been seen by a viewer of the display. At a second angle of rotation, such as 270 degrees of FIG. 5E, the second MOE color 4 can be seen by a viewer of the display. Advantageously, because of the use of clear portions and a color backplane, at a third angle of rotation such as 45 degrees of FIG. 5D, the color of the backplane and some of one of the colors of the MOEs can be seen by a viewer of the display. These implementations are advantageous in that they can be used to produce 3-color reflective displays.

FIGS. 6A-6C illustrate a further MOE embodiment of the present invention. FIGS. 6A-6C show a cylindrical shaped MOE where there is a first color plane and a second color plane that are perpendicular to one another, with each color plane including two separate colors. Thus, the MOE of this embodiment has the potential to display up to four different colors depending on the direction of rotation. Of course, it will be appreciated that the two color planes may include less than four distinct colors. In other words, the first color plane and the second color may include at least one of the same colors as circumstances warrant.

For simplicity, in FIGS. 6A-6C the four colors are clearly numbered 1-4. This MOE design also has magnetic material which can be placed at various locations including within the color layers themselves as previously discussed. As the MOE cylinders rotate (CW=clockwise and CCW=counterclockwise) to the different positions as shown in FIGS. 6A-6C, different colors can be seen by a viewer. This is advantageous in display type applications where more than two colors are desirable.

One issue this patent is concerned with, and discloses herein, are various MOEs manufacturing methods. One such method is extrusion (or co-extrusion, "pull-trusion" or the like) to make these unique magnetic-optical elements.

Figure 7:
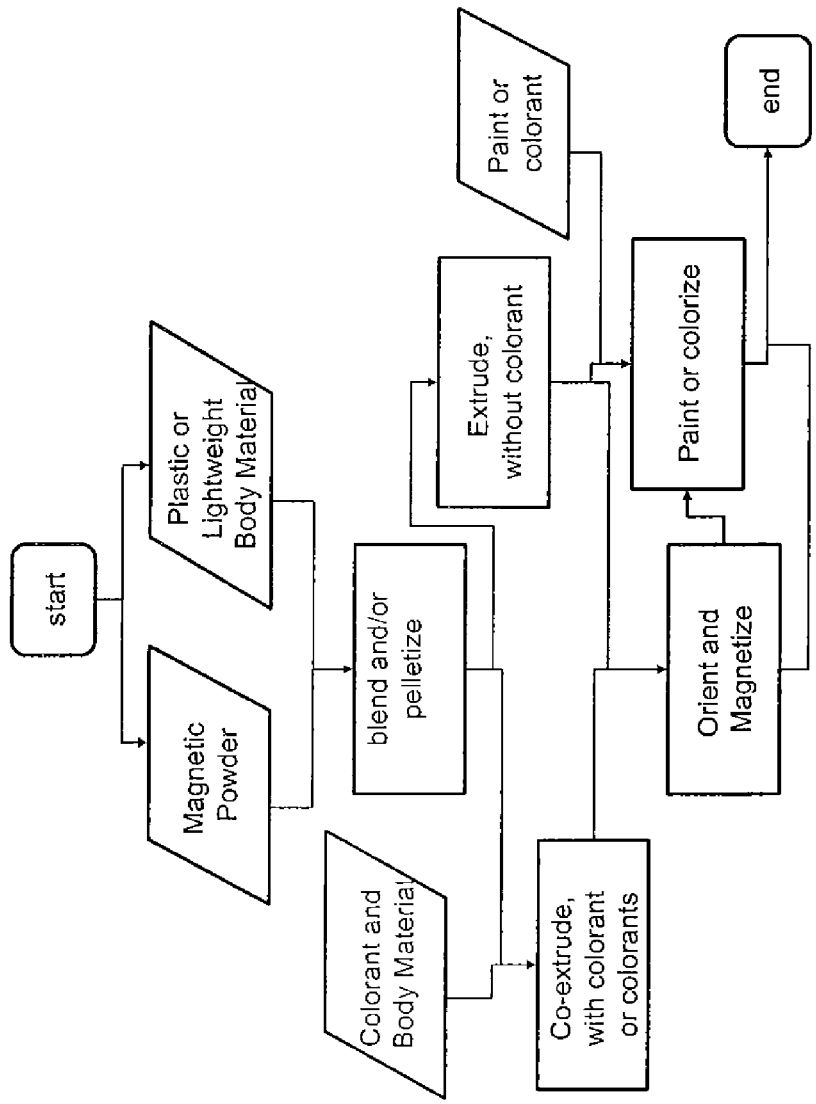
FIG. 7 represents a MOE manufacturing flow chart.

FIG. 7 shows a flow diagram of possible methods of MOE manufacturing by means of an extrusion-type process. As is shown in the figure, fine magnetic materials, often fine permanent magnetic materials such as rare-earth materials like Neodymium Iron Boron or Samarium Cobalt (as well as a variety of other magnetic materials) are blended or otherwise mixed with a plastic or lightweight material (body material) to form a composite magnetic material. In some embodiments, the composite material may be made into pellets for ease of extrusion.

In one preferred embodiment, as also depicted in FIG. 7, an anisotropic permanent magnetic material is blended with the plastic (or other body) material and in addition, two colorant/plastic (or other body) materials are also blended. These three batches of filled plastic materials are then co-extruded together such that the two colors are on the outermost portion of the MOEs, a schematic of which was previously shown in FIG. 2A. Here, the MOEs are magnetized after the final co-extrusion process. As mentioned above, the body material may be a plastic or polymer, ceramics, glasses, composites, metals, alloys, or any combination thereof.

As also shown in FIG. 7, in another embodiment of the current invention, the composite magnetic material/body material goes through an extrusion process without a colorant. Here, the colorant is then painted on or otherwise added to the composite material to achieve the final MOE shape, architecture and color schematic. The MOEs may then be magnetized as previously described. It should be noted here, that adding the colors in a subsequent step as given here is advantageous in that it is easier to produce a wide variety of different colored MOEs with less impact on supply chain issues.

In other embodiments, the extruded magnetic/body composite material may be magnetized and oriented as previously described prior to having any colorant added. After being magnetized, the colorant is added. As can be seen, FIG. 7 covers all of these varying processes all of which are inclusive in this invention.

It should be noted that the MOEs can be produced with any permanent magnetic material and any plastic or body material, but more typically a low friction plastic material such as Nylon, Acrylic, Teflon, or any plastic material.

Figure 8:
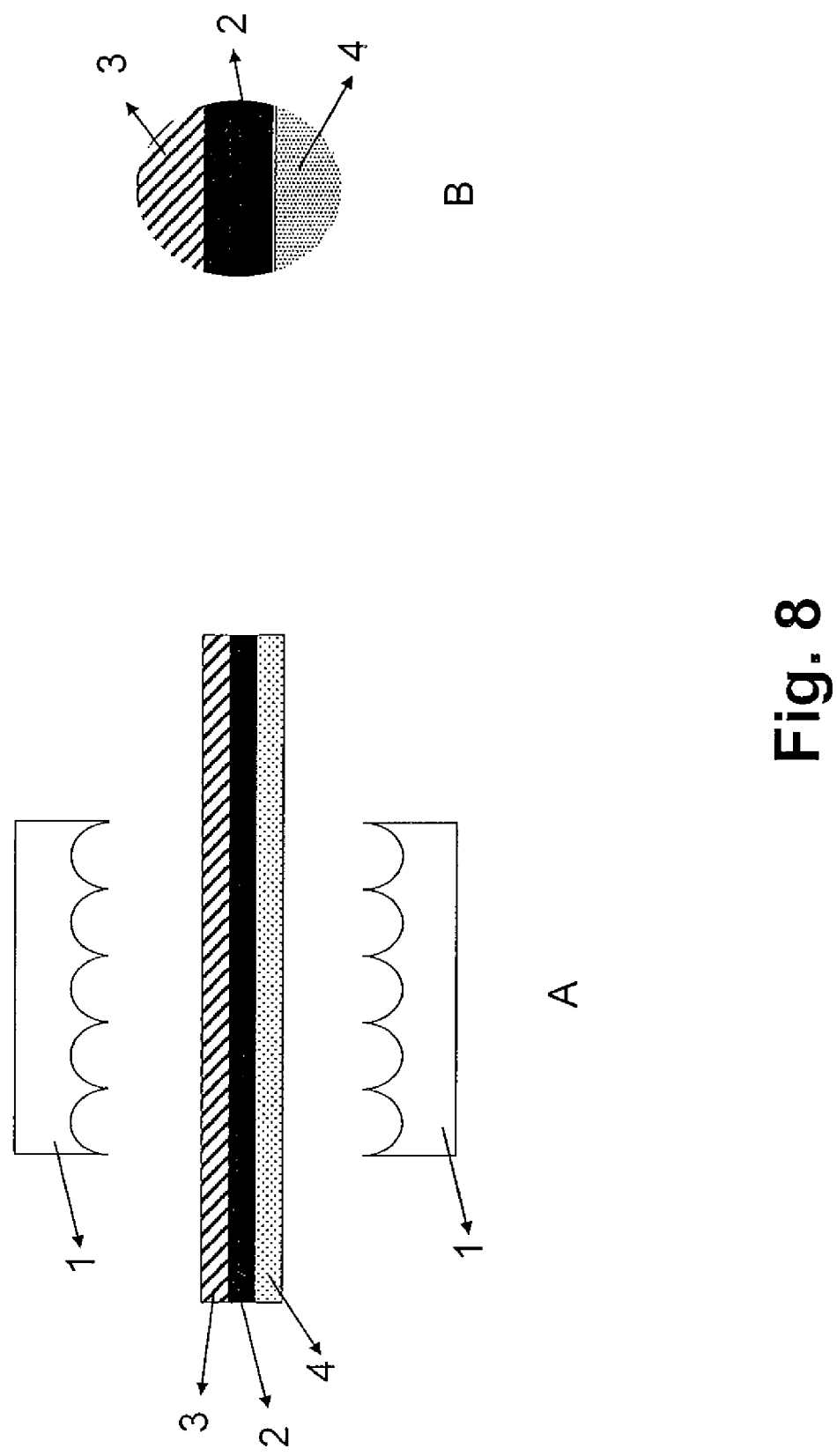
FIG. 8 is a representation of a MOE manufacturing method using a multilayer/laminate and stamp process.

In reference to FIGS. 8A and 8B, another method of producing MOEs according to the principles of the present invention is by stamping. As shown in FIG. 8A, a layered or laminate comprising magnetic material designated at 2, a first color designated at 3 and a second color designated at 4 in produced. This layered structure can be formed by a wide variety of processes including screen-printing, roll-coating, slow-die, spraying, lamination or the like. The layered material is then stamped with a stamp (designated at 1) that has the rough shape of the final MOE, as depicted in FIG. 8A. As shown in FIG. 8B, the resulting MOE includes the magnetic material designated at 2 and the first and second colors designated at 3 and 4 respectively.

It is also anticipated that the various embodiments of MOEs disclosed herein can also be prepared by means of casting or molding. As will be appreciated by one of skill in the art after reading this specification, there are a variety of industrial plastic forming processes that can be used to create the various embodiments of MOEs disclosed herein that are also within the scope of the embodiments disclosed herein. In all the fabrication methods, it is anticipated that subsequent milling, polishing, de-burring, smoothing, trimming, painting, coating (including low-friction coatings) may be used and such are within the scope of the embodiments disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A composite magnetic display element comprising:
   a body material portion;
   a magnetic material portion;
   a first optical portion having a first color;
   a second optical portion having a second color, wherein the first and second optical portions bisect along a plane of color separation; and
   wherein the magnetic display element is magnetized such that a North-South dipole of the display element is parallel to the plane of color separation and perpendicular to an axis of rotation of the display element; and
   wherein a magnetic strength of said magnetic material portion helps align a neighboring magnetic display element and said magnetic display element when said elements are configured in a stable state.

2. The composite magnetic display element of claim 1, wherein the body material portion is a polymer based material.

3. The composite magnetic display element of claim 1, wherein the body material portion is one of ceramics, glasses, composites, metals, alloys, or any combination thereof.

4. The composite magnetic display element of claim 1, wherein the display element has an aspect ratio of 1/1 to 50/1 and wherein the display element has a diameter of 0.1 millimeters to 10 millimeters.

5. The composite magnetic display element of claim 1, wherein the magnetic material portion is equally distributed underneath the first and second optical portions.

6. The composite magnetic display element of claim 1, wherein the magnetic material portion is unequally distributed underneath the first and second optical portions.

7. The composite magnetic display element of claim 1, wherein the magnetic material portion is a rare earth magnetic material.

8. The composite magnetic display element of claim 1, wherein the display element is one of cylindrical, near cylindrical, or oblong in shape.

9. The composite magnetic display element of claim 1, wherein the display element is configured to rotate about a single axis when subjected to an external magnetic field and wherein the display element further includes a third optical portion having a third color.

10. A composite magnetic display element comprising:
    a body material portion;
    a magnetic material portion;
    a first optical portion that is clear or transparent;
    a second optical portion having a first color;
    a third optical portion having a second color, wherein the second and third optical portions bisect along a plane of color separation; and
    wherein the magnetic display element is magnetized such that a North-South dipole of the display element is parallel to the plane of color separation and perpendicular to an axis of rotation of the display element; and
    wherein a magnetic strength of said magnetic material portion helps align a neighboring magnetic display element and said magnetic display element when said elements are configured in a stable state.

11. The composite magnetic display element of claim 10, wherein the body material portion is a polymer based material.

12. The composite magnetic display element of claim 10, wherein the body material portion is one of ceramics, glasses, composites, metals, alloys, or any combination thereof.

13. The composite magnetic display element of claim 10, wherein the first optical portion is comprised of a non-colored plastic which is see-through to a viewer.

14. The composite magnetic display element of claim 10, wherein the display element is coupled to a backplane that emits a third color that is different from the first and second colors, wherein subjecting the display element to an external magnetic field causes the display element to rotate such that at a first angle of rotation the first color is visible to a viewer, at a second angle of rotation the second color is visible to a viewer, and at a third angle of rotation the third color is visible to a viewer.

15. A composite magnetic display element comprising:
    a body material portion;
    a first optical portion having a first color and a second color, wherein the first and second colors form a first color plane, said first color plane comprising a magnetic material portion magnetized such that a North-South dipole of the display element is parallel to said first color plane and perpendicular to an axis of rotation of the display element;
    a second optical portion having a third color and a fourth color, wherein the third and fourth colors form a second color plane, said second color plane comprising a magnetic material portion magnetized such that a North-South dipole of the display element is parallel to said second color plane and perpendicular to an axis of rotation of the display element;
    wherein the first and second color planes are perpendicular to one another; and
    wherein a magnetic strength of said magnetic display element helps align a neighboring magnetic display element and said magnetic display element when said elements are configured in a stable state.

16. The composite magnetic display element of claim 15, wherein the body material is one of polymer, ceramics, glasses, composites, metals, alloys, or any combination thereof.

17. The composite magnetic display element of claim 15, wherein the display element further includes a third optical portion that is clear or transparent.

18. The composite magnetic display element of claim 15, wherein at least one of the first, second, third, and fourth colors is the same color as one of the first, second, third, and fourth colors.

19. The composite magnetic display element of claim 15, wherein subjecting the display element to an external magnetic field causes the display element to rotate such that at a first direction and angle of rotation the first color is visible to a viewer, at a second direction and angle of rotation the second color is visible to a viewer, at a third direction and angle of rotation the third color is visible to a viewer, and at a fourth direction and angle of rotation the fourth color is visible to a viewer.

* * * * *